United States Patent Office
3,585,183
Patented June 15, 1971

3,585,183
PHENYL-AZO-NAPHTHOL DYES CONTAINING A DISULFIMIDE GROUP
Roderick H. Horning, Reading, Pa., assignor to Crompton & Knowles Corporation, Worcester, Mass.
No Drawing. Filed June 14, 1968, Ser. No. 736,983
Int. Cl. C07c 107/04; C09b 29/20
U.S. Cl. 260—203
6 Claims

ABSTRACT OF THE DISCLOSURE

A phenyl-azo-naphthol dyestuff containing a disulfimide group of the general formula:

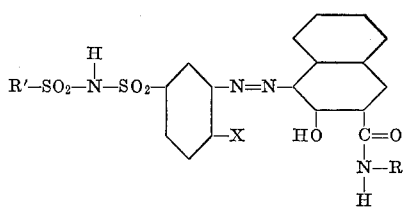

wherein R is an unsubstituted phenyl or naphthyl group or a substituted phenyl group that is free of ionogenic substituents and that has a total molecular weight of not more than 175, X is —H, —Cl, —CH₃, and R' is an unsubstituted phenyl, naphthyl or biphenyl group or a substituted phenyl group that is free of ionogenic substituents and that has a total molecular weight of not more than 150, with the proviso that when X is —Cl then R is a group as defined other than an unsubstituted phenyl group, which is soluble in water and dyes synthetic and natural polyamide fibers such as nylon, silk and wool in red shades with little sensitivity to the presence of metal ions in the dye bath.

---

This invention relates to a new group of monoazo compounds which are useful as dyes. The new compounds have the following structure:

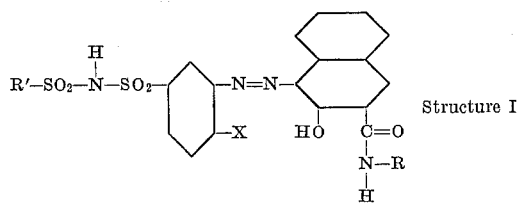

Structure I wherein R represents an aryl group having a total molecular weight of not more than about 175, X represents a substituent selected from the group consisting of hydrogen, chloro, methyl, and methoxy and R' represents an aryl group having a total molecular weight of not more than about 150. Both R and R' are to be free or ionogenic substituents, and where X is chloro, R must be an aryl radical as defined other than an unsubstituted phenyl group. As used herein the term aryl group contemplates both unsubstituted aryl radicals and aryl radicals that include simpler substituents such as halogen, alkyl, alkoxy and nitro groups and the like; the most significant radicals being the phenyl and naphthyl radicals.

The new compounds are obtained by diazotizing 3-amino-4'-methyl-1,1'-diphenyl disulfimide and coupling the diazo to arylamides of 3 hydroxy-2-naphthoic acid under alkaline conditions and thereafter recovering the dyestuff either in the form of its free acid or its salts.

A somewhat related group of compounds viz, those having the structure:

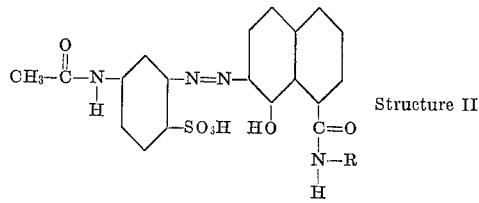

Structure II (R representing an aryl group having a total molecular weight of not more than 175) are known to be useful as dyes for polyurethane fibers and natural and synthetic polyamide fibers (see U.S. Pat. 3,311,606).

The compounds prepared in accordance with this invention are particularly valuable for use as dyes for synthetic and natural polyamide fibers such as nylon, silk and wool. They dye these fibers in red shades which tend to be both yellower and brighter than the shades produced by the compounds described in U.S. 3,311,606. The dyed fibers show properties similar to fibers dyed with the compounds of U.S. 3,311,606. The dyes of this invention, however, differ therefrom in some respects in that they are particularly valuable because they are considerably more water soluble and much less sensitive to the presence of metal ions in the dye bath than are the compounds of 3,311,606; this is especially true of calcium ions that frequently occur in objectionable concentrations in water used in making up dye baths in the plant. Nevertheless, the dyes of this invention can be used to effect dyeing from a neutral solution and they provide a degree of exhaustion similar to that provided by the compounds of 3,311,606. The compounds of this invention have a higher molecular weight than the compounds of the '606 patent, and, like the '606 compounds have but a single water solubilizing group. Therefore, it is surprising that the compounds of this invention are significantly more soluble than those of Pat. 3,311,606. One would expect that the lower molecular weight compounds would be more soluble.

The intermediate 3'-amino-1,1'-diphenyl disulfimides are easily prepared from commercially available materials following well known procedures. For example, the appropriately substituted nitro benzene such as nitrobenzene, o-nitrotoluene, o-nitro anisole, or nitro chlorobenzene is chlorosulfonated with chlorosulfonic acid, reacted with aqueous ammonia to produce the amide, treated in alkaline solution with the appropriate sulfonyl chloride such as p-toluene sulfonyl chloride or benzene sulfonyl chloride to give the desired R' radical and finally reduced with iron in weakly acidic solution.

The 3'-amino-1-1'-diphenyl-disulfimides can be diazotized and coupled under alkaline conditions with coupling components which are arylamides of 3-hydroxy-2-naphthoic acid. In general, the commercially available coupling components of this type are known as the Naphthol AS series that are useful for the production of azoic dyes (see the Chemistry of Synthetic Dyes and Pigments-Lubs-ACS Monograph No. 127 commencing at page 181).

However, unlike the azoic dyes, the dyes of this invention have good solubility in water, excellent affinity for polyamide fibers in neutral solution and very little affinity for cotton or regenerated cellulose. The invention, however, is not to be construed as being limited to the arylamides of the Naphthol AS series. Any arylamide of 3-hydroxy-2-naphthoic acid, which when coupled with a diazotized base of a 3'-amino-1-1'-diphenyldisulfimide will form a compound of Structure I wherein R is an aryl group that does not contain an ionogenic substituent and having a total molecular weight of not more than about 175 can be employed. Where the molecular weight of the R of Structure I compounds is greater than about 175, the resulting dye will typically have reduced solubility in water, thereby reducing its usefulness as a neutral dyeing dye for polyamide fibers. In like manner R' may be any aryl group that does not contain an ionogenic substituent and having a total molecular weight less than about 150; higher molecular weights typically reducing the aqueous solubility of the dyestuffs. If either R or R' contains an ionogenic substituent, the neutral dyeing capability of the dye is substantially lost. Variation of substituent X in Structure I serves to produce some variation in the shade, the solubility and the lightfastness of the dye of Structure I. For example, when X is methoxy the dye of Structure I is a bluer shade of red, is more soluble and less fast to light than when X is hydrogen. Of particular value in terms of solubility, neutral exhaustion from the dye bath, lightfastness and brightness of shade are those dyes of Structure I wherein R is anilino, o-toluidino, p-anisidino, o-phenetidino and 4-chloro anilino, R' is p-tolyl and X is hydrogen. It is also to be understood that the disulfimide group may be present as the free acid or a salt of the acid such as sodium. Use of the free acid form in representing the structure is not intended to limit the dyes to this structure but is intended to include the salts such as sodium, potassium and ammonium.

The following examples will serve to illustrate how the compounds of this invention can be prepared. In these examples, unless otherwise indicated, parts are by weight, temperatures are in degrees Centigrade and percentages are percentages by weight.

EXAMPLE 1

A 9.2 gram portion of 3-amino-4'-methyl-1-1'-diphenyl disulfimide (prepared by chlorosulfonating nitrobenzene, converting the chlorosulfonated material to the amide, reacting the amide with p-toluenesulfonyl chloride under alkaline conditions followed by reduction with iron in a weakly acid solution) was slurried in 150 ml. water and dissolved by adding soda ash until the solution provided an alkaline reaction on Brilliant Yellow paper. A solution containing 7.1 g. sodium nitrite was added and the whole was poured slowly over a mixture of 30 ml. concentrated hydrochloric acid and ice. Sufficient additional ice was added to maintain the temperature at 10° while stirring for 30 minutes to complete the diazotization. A small quantity of sulfamic acid solution was added to destroy the excess nitrite ion present. A 13.2 gram portion of Naphthol AS was dissolved in a solution containing 120 ml. of water, .5 g. Versenex-80 (a solution of diethylenetriamine penta acetic acid, penta sodium salt) and 4.4 g. sodium hydroxide by stirring. The Naphthol AS solution and 7.5 g. soda ash were slowly and simultaneously added to the slurry. At the end of the addition the volume of the coupling reaction was 550 ml., the temperature was 18° and the pH was 10.8. The reaction mixture was stirred overnight, filtered and dried. The free acid form of the dye obtained was

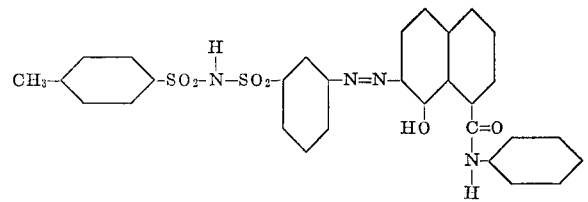

Structure III and dyed nylon in a bright yellowish red shade from a neutral dye bath with good color exhaustion.

In a manner similar to Example 1, various Structure I dyes were prepared, in all cases R', R and X were varied by using the precursors indicated in Table I in lieu of the Naphthol AS, p-toluene sulfonyl chloride and nitrobenzene that were used in making the Structure III material.

TABLE I

| Example | Sulfonyl chloride used for R' | R' | Nitrobenzene used for X | X | Arylamide used for R | R |
|---|---|---|---|---|---|---|
| 2 | p-Toluene sulfonyl chloride. | CH$_3$—⟨ ⟩— | Nitrobenzene | —H | Naphthol AS-D | ⟨ ⟩— with CH$_3$ |
| 3 | do | Same as above | do | —H | Naphthol AS-BG | ⟨ ⟩— with OCH$_3$ and CH$_3$O |
| 4 | do | do | do | —H | Naphthol AS-BS | ⟨ ⟩— with O$_2$N |
| 5 | do | do | do | —H | Naphthol AS-E | Cl—⟨ ⟩— |
| 6 | do | do | do | —H | Naphthol AS-OL | ⟨ ⟩— with OCH$_3$ |
| 7 | do | do | do | —H | Naphthol AS-TR | Cl—⟨ ⟩— with CH$_3$ |
| 8 | do | do | do | —H | Naphthol AS-ITR | CH$_3$O—⟨ ⟩— with Cl and OCH$_3$ |

TABLE I—Continued

| Example | Sulfonyl chloride used for R' | R' | Nitrobenzene used for X | X | Arylamide used for R | R |
|---|---|---|---|---|---|---|
| 9 | do | do | do | —H | Naphthol AS–LC | 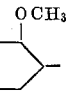 |
| 10 | do | do | do | —H | Naphthol AS–BO |  |
| 11 | do | do | do | —H | Naphthol AS–SW |  |
| 12 | do | do | do | —H | Naphthol AS–PH | 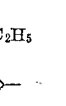 |
| 13 | do | do | O-Chloro nitrobenzene | —Cl | Naphthol AS | 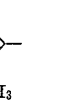 |
| 14 | do | do | do | —Cl | Naphthol AS–D | 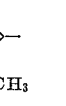 |
| 15 | do | do | do | —Cl | Naphthol AS–OL | 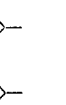 |
| 16 | do | do | o-Nitrotoluene | —CH$_3$ | Naphthol AS | 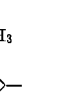 |
| 17 | do | do | do | —CH$_3$ | Naphthol AS–D | 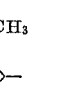 |
| 18 | do | do | do | —CH$_3$ | Naphthol AS–OL | 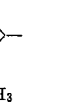 |
| 19 | do | do | o-Nitro anisole | —OCH$_3$ | Naphthol AS | 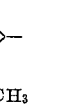 |
| 20 | do | do | do | —OCH$_3$ | Naphthol AS–D | 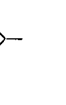 |
| 21 | do | do | do | —OCH$_3$ | Naphthol AS–OL | 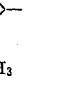 |
| 22 | Benzene sulfonyl chloride |  | Nitrobenzene | —H | Naphthol AS | 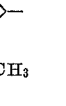 |
| 23 | do | Same as above | do | —H | Naphthol AS–D |  |
| 24 | do | do | do | —H | Naphthol AS–OL | 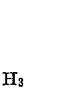 |
| 25 | Naphthalene-2-sulfonyl chloride |  | do | —H | Naphthol AS | 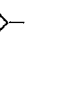 |
| 26 | do | Same as above | do | —H | Naphthol AS–D |  |

TABLE I—Continued

| Example | Sulfonyl chloride used for R' | R' | Nitrobenzene used for X | X | Arylamide used for R | R |
|---|---|---|---|---|---|---|
| 27 | do | do | do | —H | Naphthol AS-LO | (phenyl with OCH₃) |
| 28 | p-Chloro benzene sulfonyl chloride. | Cl—⟨phenyl⟩— | do | —H | Naphthol AS | (phenyl) |
| 29 | do | Same as above | do | —H | Naphthol AS-D | (phenyl with CH₃) |
| 30 | do | do | do | —H | Naphthol AS-OL | (phenyl with OCH₃) |
| 31 | Biphenyl-4-sulfonyl chloride. | ⟨phenyl⟩—⟨phenyl⟩— | do | —H | Naphthol AS | (phenyl) |
| 32 | do | Same as above | do | —H | Naphthol AS-D | (phenyl with CH₃) |
| 33 | do | do | do | —H | Naphthol AS-OL | (phenyl with OCH₃) |
| 34 | p-Toluenesulfonyl chloride. | CH₃—⟨phenyl⟩— | o-Chloronitrobenzene. | —Cl | Naphthol AS-RL | CH₃O—⟨phenyl⟩— |
| 35 | do | Same as above | do | —Cl | N-p-tolyl-2-oxy-3-naphthamide. | CH₃—⟨phenyl⟩— |

The compounds of Examples 1–12 and 14–35 were characteristically more soluble in water, gave yellower shades and were less sensitive to metal ions than were the dyes of Pat. 3,311,606; in other respects (specifically in neutral dyeing capabilities and exhaustion) they were similar to the dyes of the '606 patent.

The compound of Example 13 (wherein X is —Cl and R is phenyl) shows some solubility peculiarities. It dissolves in hot water and then precipitates—apparently due to a self-complexing reaction. Other Structure I compounds where X is —Cl do not act in this way; thus compounds where X is —Cl and R is a substituted phenyl group (see Examples 14, 15, 34 and 35) are soluble in water and remain in water solution and are therefore useful as dyes—so too do the compounds of Examples 1–12 and 16–35.

I claim:
1. A compound having the structure

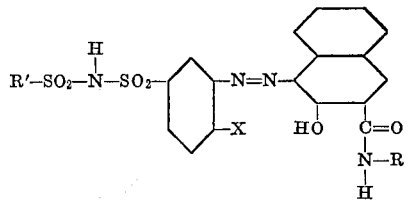

where R represents an unsubstituted phenyl group or an unsubstituted naphthyl group or a substituted phenyl group that is free of ionogenic substituents and that has a total molecular weight of not more than about 175, X represents —H, —Cl, —CH₃ and R' represents an unsubstituted phenyl group, an unsubstituted naphthyl group or an unsubstituted biphenyl group or a substituted phenyl group that is free of ionogenic substitutents and that has a total molecular weight of not more than 150, said compound being further characterized in that when X is —Cl, R is a group as defined other than an unsubstituted phenyl group.

2. A compound according to claim 1 wherein R' is

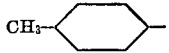

X is —H and R is

3. A compound according to claim 1 wherein R' is

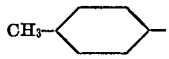

X is —H, and R is

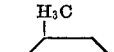

4. A compound according to claim 1 wherein R' is

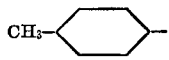

X is —H and R is

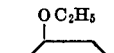

5. A compound according to claim 1 wherein R' is

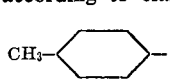

X is —H and R is
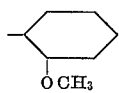
6. A compound according to claim 1 wherein R' is
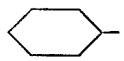
X is —H and R is
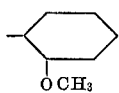
References Cited
UNITED STATES PATENTS
2,766,231  10/1956  Bolliger _____ 260—201X
CHARLES B. PARKER, Primary Examiner
C. F. WARREN, Assistant Examiner
U.S. Cl. X.R.
8—41; 260—556

UNITED STATES PATENT OFFICE
CERTIFICATE OF CORRECTION

Patent No. 3,585,183                               Dated June 15, 1971

Inventor(s) Roderick H. Horning

It is certified that error appears in the above-identified patent and that said Letters Patent are hereby corrected as shown below:

Column 2, lines 3-11, the portion of Structure II shown as

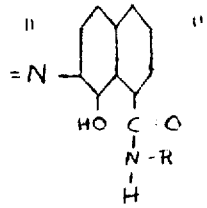    should read-- 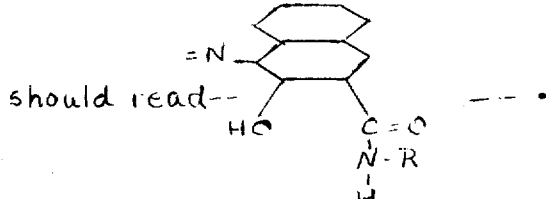  --.

Column 4, lines 20-30, the portion of Structure III shown as

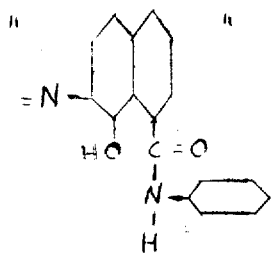    should read-- 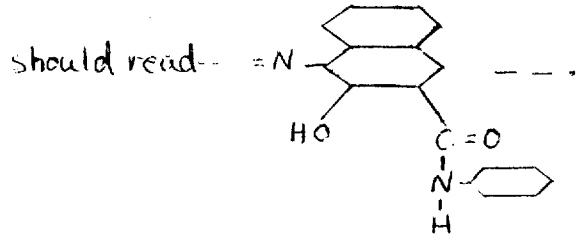  --.

Column 8, example 27 in TABLE I, "AS-LO" should read

--AS-OL--.

Signed and sealed this 28th day of December 1971.

(SEAL)
Attest:

EDWARD M. FLETCHER, JR.                           ROBERT GOTTSCHALK
Attesting Officer                                 Acting Commissioner of Patents